United States Patent [19]

Shoup

[11] 4,442,336
[45] * Apr. 10, 1984

[54] APPARATUS FOR CONDUCTING SMUT-FREE STUD WELDING

[75] Inventor: Thomas E. Shoup, Amherst, Ohio

[73] Assignee: TRW Inc., Cleveland, Ohio

[*] Notice: The portion of the term of this patent subsequent to Feb. 23, 1999 has been disclaimed.

[21] Appl. No.: 310,142

[22] Filed: Oct. 9, 1981

Related U.S. Application Data

[63] Continuation-in-part of Ser. No. 75,751, Sep. 14, 1979.

[51] Int. Cl.³ .............................................. B23K 9/20
[52] U.S. Cl. ........................................ 219/98; 219/99
[58] Field of Search ........................ 219/98, 99, 137.43

[56] References Cited

U.S. PATENT DOCUMENTS

| | | | |
|---|---|---|---|
| 3,092,714 | 6/1963 | Hinden | 219/98 |
| 3,536,888 | 10/1970 | Borneman | 219/137.43 |
| 3,597,573 | 8/1971 | Ettinger | 219/99 |
| 4,306,137 | 12/1981 | Shoup et al. | 219/98 X |
| 4,317,020 | 2/1982 | Shoup | 219/98 |

Primary Examiner—B. A. Reynolds
Assistant Examiner—C. M. Sigda
Attorney, Agent, or Firm—Allen D. Gutchess, Jr.

[57] ABSTRACT

Apparatus is provided for welding studs to a workpiece with the area around the welds being substantially free of smut. The existence of the smut detracts from the appearance of the workpiece and if the workpiece is to be painted or otherwise covered with a coating material, the smut must first be removed. The coating of smut can be eliminated if, during the weld process, fluid is carefully deposited on the weld area around the end of the stud where the weld occurs. The fluid consists of a small volume of low-pressure air and an anti-smut liquid. The latter also helps to keep weld splatter from adhering to the interior of a spark shield used with the stud. However, by applying a non-metallic, preferably plastic, sleeve within the spark shield, the problem of splatter can be further reduced or substantially eliminated.

30 Claims, 10 Drawing Figures

APPARATUS FOR CONDUCTING SMUT-FREE STUD WELDING

This application is a continuation-in-part of my co-pending application Ser. No. 075,751, filed on Sept. 14, 1979.

This invention relates to apparatus for welding studs to a workpiece without a coating of smut being deposited thereon, by supplying low pressure air and anti-smut liquid through a spark shield assembly positioned around the stud.

When studs are welded to workpieces by a drawn-arc, stud-welding technique, it is not uncommon for a coating of smut to be deposited on the workpiece around the welded end of the stud. This frequently occurs with trim studs which are welded to automobile bodies for the subsequent attachment of clips and trim strips or windshield mounting clips, for example. After the studs are welded and before the clips and trim are applied, the body receives a protective coating such as a primer, and subsequent decorative coatings. If the coating of smut around the welded stud is not first removed from the automobile body, the protective coating will not adhere properly and will separate from the surface. Thus, an extra operation is required to remove the smut after welding and before the first coating is applied.

Apparatus is provided for welding studs to workpieces without coatings of smut being deposited thereon. A spark shield is utilized around the stud and a chuck in which the stud is held, with the spark shield having a plurality of passages therein which are directed toward the workpiece around the location where the stud is to be welded. Fluid is then directed through the passages toward the area during the welding cycle. The fluid consists of low pressure air and an anti-smut liquid which is gently deposited on the surface of the weld area at low velocity, in thin films. The fluid does not impinge directly on the weld area in line with the end of the stud; otherwise, the pilot arc and the subsequent welding arc imposed between the end of the stud and the workpiece may be blown out or extinguished so that a weld would not result. The end of the spark shield also has a plurality of notches therein through which gases and small beads of weld metal, known as splatter, can escape. The notches also help to direct the fluid.

The spark shields are intended to last for thousands of weld cycles. However, heretofore, the weld splatter over a period of time has built up on the inner surface of the spark shield to the point of interfering with the welding operation and also tends to erode the end of the spark shield, resulting in a substantially shorter life. This is particularly true when smaller amounts of anti-smut fluid are employed. For example, when welding trim studs to the inside surface of the roof of a vehicle, operators will sometimes reduce the amount of anti-smut liquid because it tends to be bothersome when welding overhead.

The present invention provides a spark shield assembly which includes an outer metal spark shield and an inner sleeve or insert, preferably of plastic material, to which the splatter or beads of weld metal tend not to adhere, and the sleeve also helps prevent the spark shield from being eroded by the splatter. The sleeve of the spark shield assembly has passages in an end which direct air or other gas and anti-smut liquid inwardly toward the weld area around the stud. The fluid is supplied to the passages from a manifold formed at the opposite end of the spark shield assembly with the passages communicating with the manifold through passage means formed between the outer spark shield and the sleeve.

It is therefore, a principal object of the invention to provide improved apparatus for welding studs to workpieces without coatings of smut being deposited on the workpieces around the stud.

Another object of the invention is to provide apparatus for welding studs to workpieces without coatings of smut, which apparatus has longer life and is more maintenance-free than the apparatus heretofore known.

A further object of the invention is to provide apparatus for preventing coatings of smut from being deposited around welded studs by directing air and anti-smut liquid onto the area around the studs during the welding cycle, which apparatus includes an outer spark shield and an inner non-metallic sleeve which resists splatter from the welds.

Many other objects and advantages of the invention will be apparent from the following detailed description of preferred embodiments thereof, reference being made to the accompanying drawings, in which.

Figure 1:
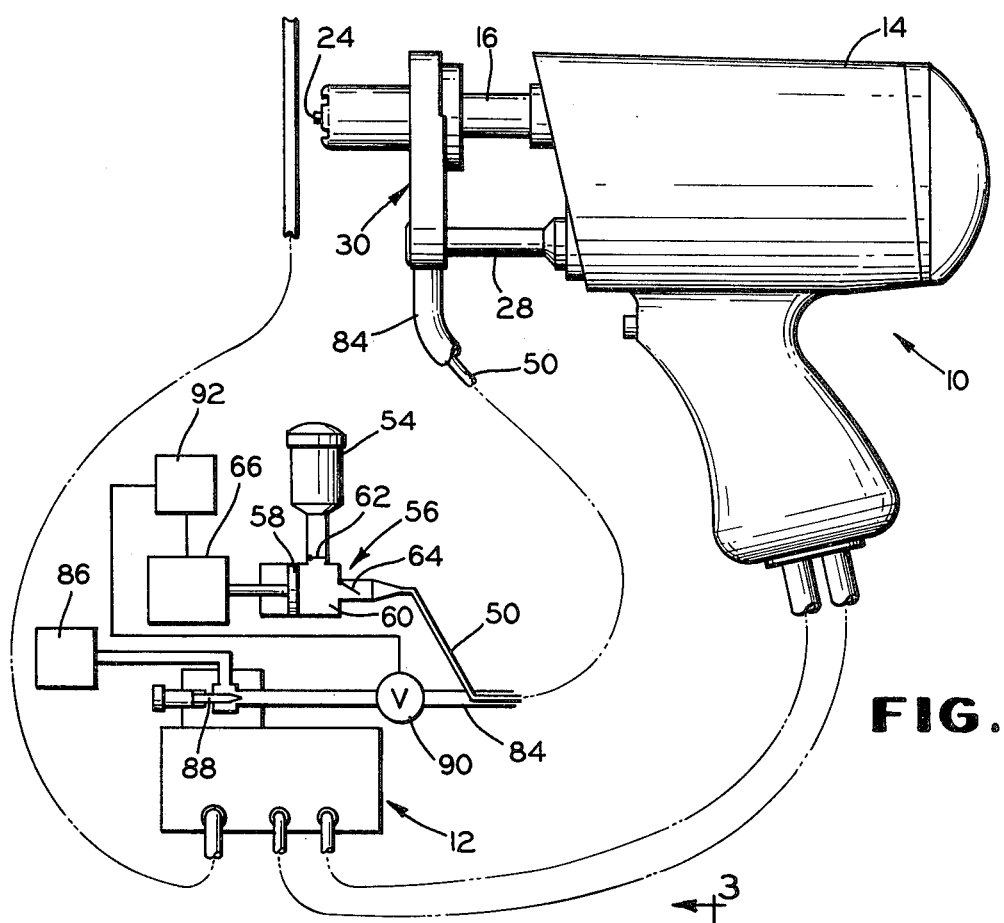
FIG. 1 is an overall schematic view, partly in elevation and partly in section, of apparatus for welding studs to workpieces in accordance with the invention.

Referring to the drawings, and particularly to FIG. 1, a stud welding tool 10 according to the invention is used to weld a stud to a workpiece by means of a drawn-arc welding technique. The basic tool is known in the art and includes means for retracting a stud from the workpiece, means for holding the stud in the retracted position for a predetermined period of time, and means for moving or plunging the stud toward and against the workpiece at the end of the predetermined period. As the stud is retracted from the workpiece, a pilot arc is drawn between the end of the stud and a main welding arc is subsequently imposed on the pilot arc, with the main welding arc then being maintained until the stud is plunged back against the workpiece. The tool can be of the type shown in U.S. Pat. No. 3,525,846, for example. This tool preferably utilizes a capacitor discharge type of power source, as shown in U.S. Pat. No. 3,136,880, for example.

Figure 2:
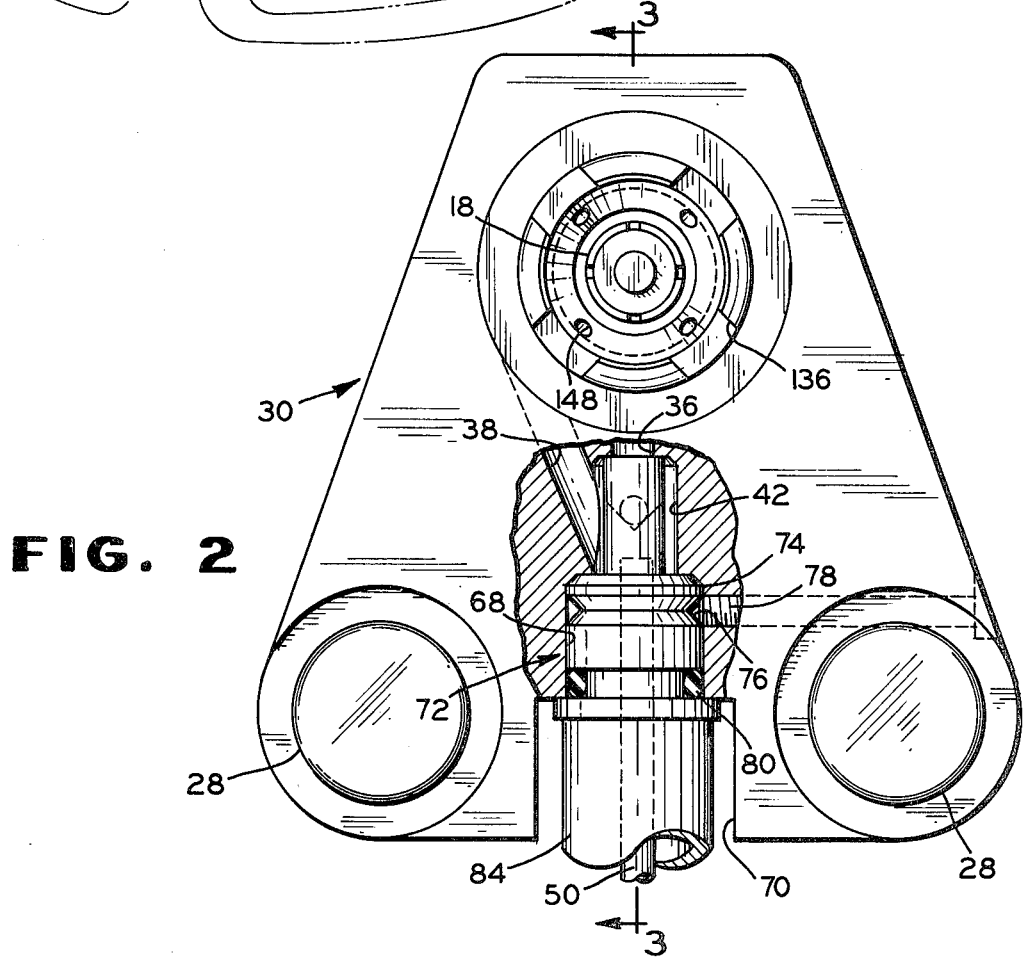
FIG. 2 is an enlarged, front view in elevation, with parts broken away and with parts in cross section, of a welding foot and a spark shield assembly of the apparatus of FIG. 1.
Figure 4:
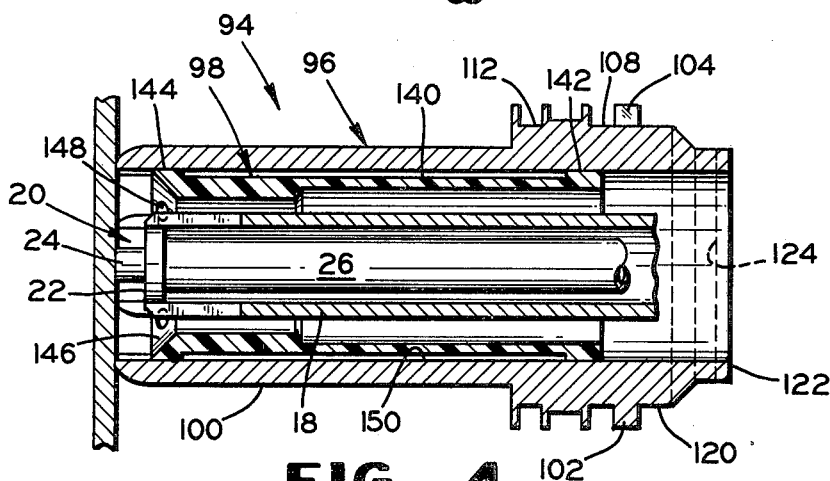
FIG. 4 is a view in longitudinal cross section of the spark shield assembly and a chuck.

A power and control unit 12 supplies power for the pilot and the main welding arcs and for a solenoid coil in a tool body 14 which retracts the stud against the force of a plunge spring when the coil is energized. A chuck leg 16 extends into the coil and also extends forwardly of the tool body 14 where it is suitably connected to a chuck 18 (FIGS. 2 and 4). In this instance, a trim stud 20 (FIG. 4) has a head 22 which is held by the chuck 18 and a stem 24 which extends forwardly, with the stud backed up by a suitable adjustable stop 26 during the welding cycle. Studs can be fed into the front of the chuck by hand. They also can be transported by air through a tube from a remote supply source and into a chamber in the chuck leg 16 behind the chuck 18. The studs can then be pushed into the chuck from the chamber by a plunger and backed up by the plunger during the welding cycle. The plunger can be connected to a piston and an air cylinder located in the chuck leg to which air is supplied from a remote source. This type of loading arrangement for the such is shown in U.S. Pat. Nos. 3,525,846 and 3,489,878, and does not constitute part of the present invention.

A pair of supporting legs 28 extend forwardly from the tool body 14 and support a welding foot 30. The welding foot 30 has a cylindrical opening 32 (FIG. 3) around the chuck leg 16 with a rear, inwardly extending flange 34. A liquid supply passage 36 for anti-smut liquid is located in the welding foot and communicates radially with the opening 32 and an air supply passage 38 is also located in the foot 30 and communicates generally tangentially with the opening 32. The liquid supply passages 36 communicates with a check valve fitting 40 located in a cylindrical chamber or passage 42 with which the air passage 38 (FIG. 2) communicates. The fitting 40 has a check valve seat 44, a check valve ball 46, and a spring 48 which prevent the flow of liquid back through a supply tube 50 which is suitably affixed in a recess 52 in a lower end of the fitting 40.

Anti-smut liquid is supplied to the tube 50 from a source 54 (FIG. 1) by a suitable pump indicated schematically at 56. The pump 56 includes a piston 58 and a cylinder 60 with an inlet check valve 62 and an outlet check valve 64. Upon each stroke of the piston 58, a small quantity of the anti-smut liquid is supplied to the tube 50 with the piston 58 reciprocated at a rate of approximately one hundred times per minute by a drive unit 66. The pump delivers about one-third of a drop of liquid during each back and forth stroke.

For supplying gas such as air, the chamber 42 (FIGS. 2 and 3) in the foot 30 communicates with a larger passage 68 terminating at the edge of a notch 70 in the bottom of the welding foot 30 between the supporting legs 28. A hose connector 72 has an end portion 74 extending into the passage 68 with an annular groove 76 receiving an end of a setscrew 78. The hose connector has an annular O-ring seal 80 and a lower nipple 82 extending into the notch 70. A hose 84 is received on the nipple 82 and extends to the power control unit 12, encompassing the liquid supply tube 50 to a point near the unit 12, Gas, preferably air, is supplied from a suitable source past an adjustable needle valve 88 and and on-off valve 90 through the hose 84. The needle valve 88 controls flow so that just enough air is supplied to cause the liquid to atomize and dribble from the spark shield sufficiently to coat the workpiece with a thin film around the weld area. The gas also is at low pressure, in a range of three to eight psi, and preferably about five psi. The liquid is supplied in a quantity of twenty-five to one hundred-twenty five milliliters per hour. The lower quantity is sufficient to prevent smut but a higher quantity of seventy milliliters is more effective to prevent splatter build-up in the spark shield. The gas and liquid are supplied continuously unless the welding tool 10 is not retriggered within two and one-half seconds, at which time the drive unit 66 is stopped and the valve 90 is closed by a suitable timer 92. The two and one-half seconds delay in shut-off enables extra liquid to be pumped into the spark shield so that it is supplied immediately and gives proper liquid coverage for the first weld made after the equipment has been idle.

Figure 3:
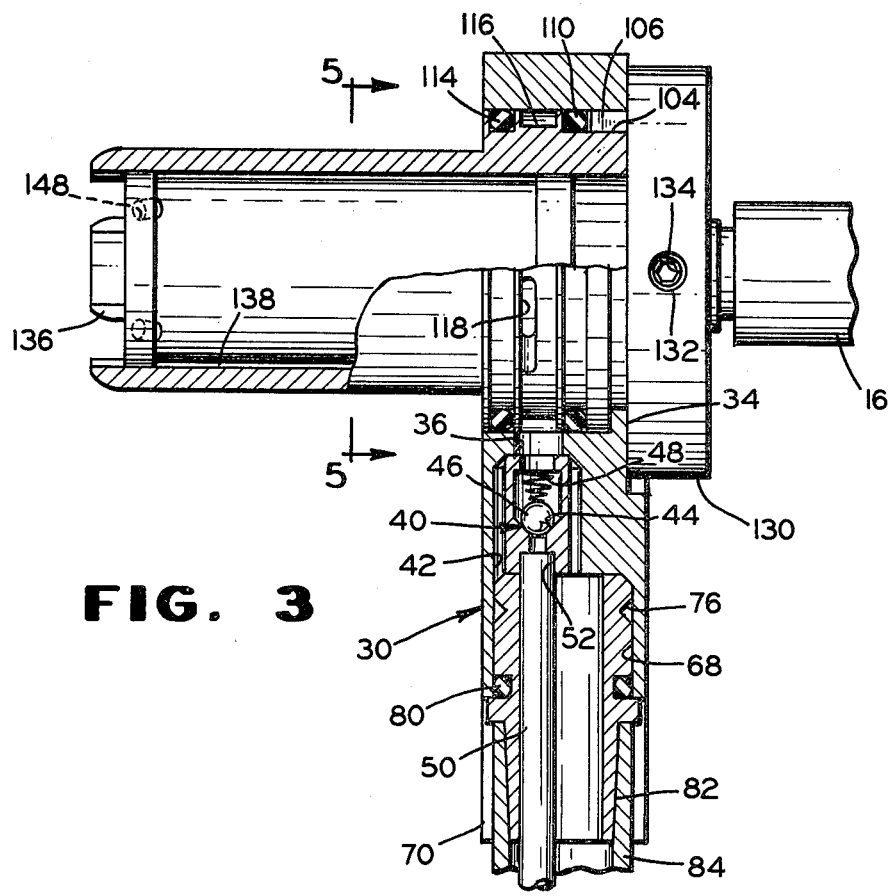
FIG. 3 is a view in vertical cross section, with parts broken away, taken generally along the line 3—3 of FIG. 2.
Figure 5:
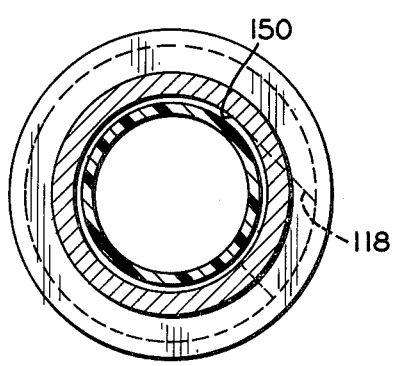
FIG. 5 is a view in transverse cross section taken generally along the line 5—5 of FIG. 3.
Figure 6:
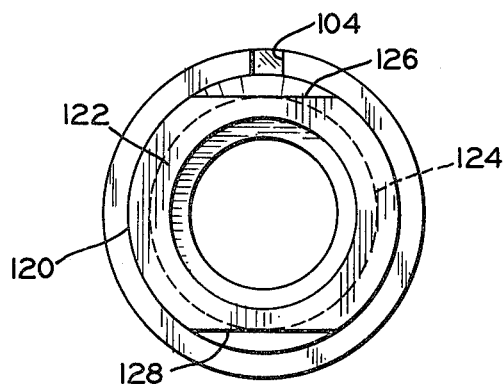
FIG. 6 is a right-end view of the spark shield assembly of FIG. 4.
Figure 7:
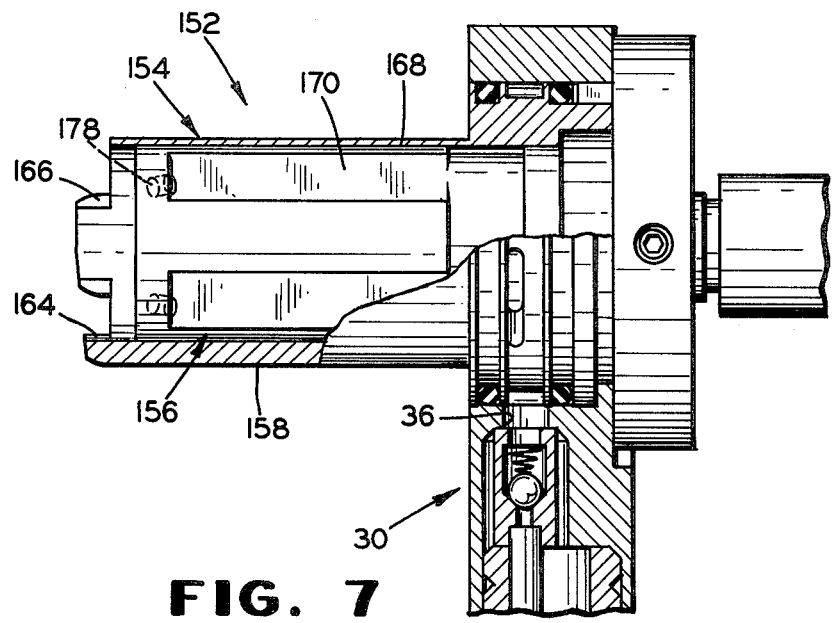
FIG. 7 is a view in vertical cross section, with parts broken away, taken through a modified spark shield assembly and welding foot.
Figure 8:
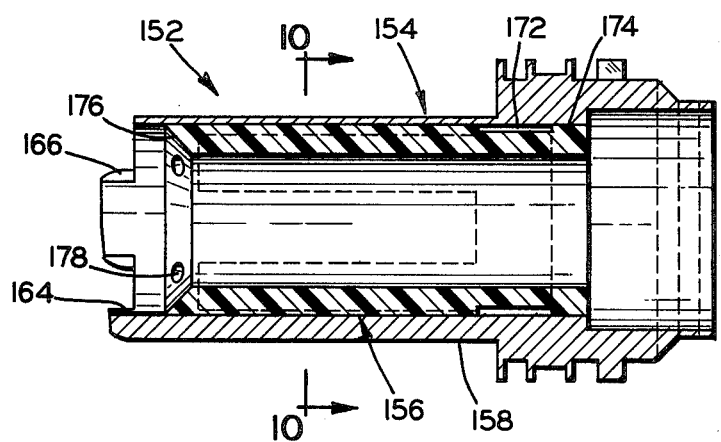
FIG. 8 is a view in longitudinal cross section of the spark shield assembly of FIG. 7.

A spark shield assembly 94 in accordance with the invention includes an outer metal spark shield 96 and an inner non-metallic sleeve or insert 98 which can be held in the shield with adhesive or can be force fit therein. The spark shield 96 is held by the welding foot 30 so that the stem 24 of the stud 20 extends slightly beyond the end of the spark shield, as shown in FIG. 1, before the stud is pressed against the workpiece and the end of the spark shield is pushed into contact therewith, as shown in FIG. 4. The spark shield 96 includes a generally cylindrical body 100 with a rear flange 102 which abuts the flange 34 of the foot 30. The upper periphery of the flange 102 has a notch 104 which receives a projection 106 projecting forwardly from the rear flange 34. This enables the spark shield assembly 94 and specifically the spark shield 96 to be oriented relative to the welding foot. An annular groove 108 is located adjacent the rear flange 102 and receives a rear O-ring 110, and a forward annular groove 112 is spaced from the groove 108 and receives an O-ring 114. A wide annular manifold 116 is located between the grooves 108 and 112. This communicates with the supply passage 36 and communicates with the interior of the spark shield 96 through a transverse passage or slot 118 (FIGS. 3 and 5).

The spark shield 96 has a generally cylindrical neck 120 extending beyond the foot flange 34 and terminating in a smaller neck 122 having an annular V-shaped groove 124 extending therearound except at upper and lower flats 126 and 128 on the neck 122. The neck configuration enables the spark shield assembly 94 to be quickly affixed to and detached from the welding foot 30 by means of a locking ring 130. This ring has two diametrically-opposite pointed setscrews 132 which have Allen head recesses 134 therein for loosening and tightening the setscrews. When the spark shield assembly 96 is inserted in the foot, the ring 130 is placed on the neck 122 with the setscrews 132 aligned vertically with the flats 126 and 128. The ring 130 is then rotated in either direction to cause the points of the setscrews 133 to move into the groove 124 of the neck 122. The setscrews can then merely be tightened slightly to provide a clamping action between the ring 130 and the neck 122 and thereby hold the spark shield assembly firmly in place in the foot 30. Slight loosening of the setscrews 132 can then enable the ring 130 to be turned so that the setscrews are in the vertical position to detach the ring from the neck 122 and remove the spark shield assembly 94 from the foot 30.

The end of the spark shield 96 adjacent the stud chuck has four notches or vents 136 of equal size therein, in this instance, with the notches being equally spaced around the periphery of the spark shield, as shown in FIG. 2. The width of the notches and the space therebetween each consume about 90 degrees of the peripheral extent of the spark shield. Otherwise, the spark shield 96 has a straight, unbroken, cylindrical inner surface 138 extending from the neck end to the notch end thereof.

The sleeve or insert 98 of the spark shield assembly is non-metallic and preferably of a plastic material. Two commercially-available plastic materials which have been found to be highly satisfactory in extending the life of the spark shield assembly are known under the trademarks "Torlon" and "Vespel". As shown particularly in FIG. 4, the sleeve includes a cylindrical main body 140 having an annular ridge or flange 142 at the end toward the neck end of the spark shield 96 located beyond the passage 118 in the spark shield. The end of the body 140 toward the notch end of the spark shield has an annular ridge or flange 144 located near the closed ends of the notches 136 but not beyond, in order to avoid obstructing the open area of the notches. This end of the sleeve 98 also has a surface 146 flaring outwardly and forming an included angle from 35° to 55°, and preferably about 45°, with the axis of the spark shield assembly and the sleeve.

A plurality of passages 148 are also located in this end of the sleeve 98 and extend from the flared surface 146, substantially perpendicularly thereto, to an annular supply chamber or passage 150 located between the flanges 142 and 144 and formed between the outer surface of the cylindrical body 140 of the sleeve and the inner surface of the spark shield 96. There are four of the passages 148, in this instance, centrally located around the periphery of the sleeve in positions centered above the notches 136 (FIG. 2). The passages 148 direct slowly moving streams of fluid in the form of air and anti-smut liquid toward the weld area around the base of the stud welded to the workpiece. This fluid is supplied from the passage 150 and from the annular manifold 116 which communicates through the flexible tubing with the supply source of FIG. 1. When four of the passages 148 are used, they can have diameters from about 0.035 to about 0.055 inch and preferably about 0.045 inch, depending upon the application. However, fewer or more of the passages can be employed, if desired.

A modified spark shield assembly is indicated at 152 in FIGS. 7-10. This includes a modified metal spark shield 154 and a modified non-metallic sleeve or insert 156. The spark shield 154 has a generally cylindrical body 158 with two flat surfaces 160 and 162 forming a much thinner wall at the upper portion of the spark shield. This enables the spark shield assembly 152 to weld a stud closer to a member projecting outwardly from the workpiece, as when welding studs for windshields and back lights of certain vehicles. The spark shield 154 also has three notches or vents in the ends thereof, including two notches 164 which are similar to the notches 136 of the spark shield 96 and also a larger notch 166 at the thin-walled portion which is much wider, extending from about one-fourth to about two-fifths of the periphery of the spark shield. Otherwise, the spark shield 154 of the assembly 152 is substantially the same as the spark shield 96 of the spark shield assembly 94.

The sleeve 156 can be made of the same material as the sleeve 98. The sleeve has a generally cylindrical body 168 but having flats 170 thereon forming passages with the inner surface of the spark shield 154. These communicate with an annular groove 172, defined in part by a rear, thickened ring or flange 174 which is located behind the supply passage of the spark shield assembly which communicates with the supply passage 36 in the foot 30. The opposite or forward end of the sleeve 156 has a flared annular surface 176 similar to the surface 146 of the sleeve 98. However, this end of the sleeve 155 terminates to the rear of the closed ends of the notches 164 and 166 so that the cylindrical inner surface of the spark shield 154 therebetween helps to confine fluid around the weld area, which helps compensate for the extra open area of the wide notch 166.

Figure 9:
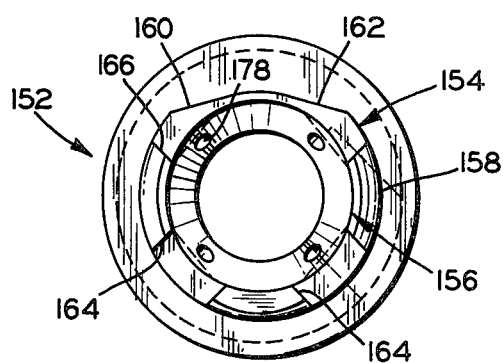
FIG. 9 is a left-end view of the spark shield assembly of FIG. 8.
Figure 10:
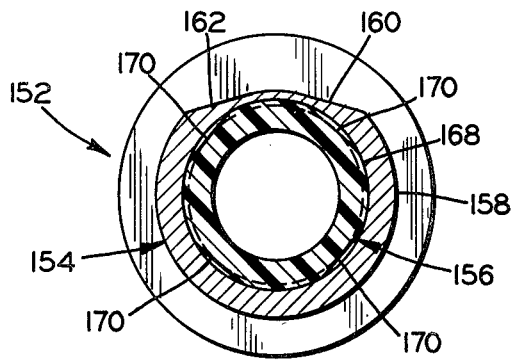
FIG. 10 is a view in transverse cross section taken along the line of 10—10 of FIG. 8.

The sleeve has four fluid passages 178 therein communicating with the flared surface 176 and each of the passages formed by the flats 170 on the sleeve. As shown in FIG. 9, two of the passages 178 are centered above the notches 164 and two are located near end portions of the wide notch 166. The flow of air and anti-smut liquid around the weld area is similar to that achieved with the spark shield assembly 94.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. Apparatus for welding a stud to a workpiece with the weld area around the stud being maintained substantially free of contaminant coatings, said apparatus comprising a welding tool having means for holding the stud, means for establishing a welding arc between the stud and the workpiece, and means for moving the stud toward and away from the workpiece, a spark shield assembly including an outer spark shield having end notches, an inner non-metallic sleeve in said shield, fluid supply passage means formed between said sleeve and said spark shield, said sleeve having a plurality of passages at an end of said sleeve toward the notched end of said spark shield, said passages being directed inwardly toward the weld area around the stud, a welding foot supporting an end portion of said spark shield opposite the notched end in a position around said holding means with an inner surface of said sleeve being spaced from said holding means, a source of gas under pressure communicating through said welding foot with said supply passage means for supplying gas through said sleeve passages during a welding operation, and a source of anti-smut liquid under pressure communicating through said welding foot with said supply passage means for supplying liquid through said sleeve passages during the welding operation.

2. Apparatus according to claim 1 characterized by said sleeve having an outwardly-flaring annular surface in which ends of said sleeve passages terminate, said flared surface forming an included angle of 35-55 degrees with the axis of said sleeve.

3. Apparatus according to claim 2 characterized by said sleeve passages terminating at said flared surface at locations centered above said notches.

4. Apparatus according to claim 3 characterized by said notches being uniformly spaced around the periphery of said spark shield.

5. Apparatus according to claim 1 characterized by end portions of said sleeve having outwardly-extending flanges contacting the inner surface of said spark shield and forming ends of said supply passage means.

6. Apparatus according to claim 5 characterized by said spark shield forming an outer annular manifold with said welding foot and having a slot extending between said outer manifold and said supply passage means.

7. Apparatus according to claim 2 characterized by said flared surface not extending any farther than the ends of said notches in order not to obstruct said notches.

8. Apparatus according to claim 1 characterized by said notches being spaced substantially uniformly around said spark shield.

9. Apparatus according to claim 1 characterized by said notches including one large notch exteding around from one fourth to two-fifths of the periphery of said spark shield.

10. Apparatus according to claim 1 characterized by said sleeve being made of a plastic material resistant to weld splatter.

11. Apparatus for welding a trim stud to a vehicle body with the weld area of the vehicle body around the welded stud being maintained substantially free of smut, said apparatus comprising a welding tool having a stud chuck extending therefrom, a welding foot, a spark shield assembly including an outer spark shield and an inner non-metallic sleeve, said spark shield having one end portion mounted in said welding foot and forming a manifold chamber therewith, means extending from said tool and supporting said welding foot with an inner surface of said spark shield positioned around the stud chuck, said sleeve being positioned within said spark shield with fluid supply passage means formed between said shield and said sleeve, said supply passage means communicating with said manifold chamber, said sleeve having a plurality of passages near the end of said spark shield opposite said welding foot, said passages communicating with said supply passage means and being directed inwardly toward the weld area of the vehicle body, and means for supplying fluid to said manifold chamber comprising means for supplying gas to said manifold chamber and means for supplying liquid to said manifold chamber.

12. Apparatus according to claim 11 characterized by said spark shield having a plurality of notches in the end thereof opposite said welding foot and extending no farther than said sleeve so that said sleeve does not obstruct said notches.

13. Apparatus according to claim 12 characterized by said sleeve terminating short of said notches.

14. Apparatus according to claim 12 characterized by said notches being spaced substantially uniformly around said spark shield.

15. Apparatus according to claim 12 characterized by said notches including one large notch extending around from one-fourth to two-fifths of the periphery of said spark shield.

16. Apparatus according to claim 11 characterized by said sleeve being made of a plastic material which is resistant to weld splatter.

17. Apparatus according to claim 12 characterized by said sleeve having an outwardly-flaring annular surface in which ends of said sleeve passages terminate, said flared surface forming an included angle of 35–55 degrees with the axis of said sleeve.

18. Apparatus according to claim 17 characterized by said sleeve passages terminating at said flared surface at locations centered above said notches.

19. Apparatus according to claim 11 characterized by end portions of said sleeve having outwardly-extending flanges contacting the inner surface of said spark shield and forming ends of said supply passage means.

20. Apparatus according to claim 11 characterized by the outer surface of said sleeve being generally cylindrical but with elongate flat portions forming at least part of said fluid supply passage means with the inner surface of said spark shield.

21. Apparatus according to claim 20 characterized by said sleeve having an annular groove at the rear of said flat portions and forming part of said supply passage means with the inner surface of said spark shield.

22. Apparatus for welding a stud to a workpiece with the weld area around the stud being maintained substantially free of contaminant coatings, said apparatus comprising a welding tool having means for holding the stud, means for establishing a welding arc between the stud and the workpiece, and means for moving the stud toward and away from the workpiece, a spark shield assembly including an outer spark shield having end notches, an inner non-metallic sleeve in said shield, fluid supply passage means formed between said sleeve and said spark shield, said sleeve having a plurality of passages at an end of said sleeve toward the notched end of said spark shield, said passages being directed inwardly toward the weld area around the stud, means carried by said welding tool supporting a portion of said spark shield spaced from the notched end in a position around said holding means with an inner surface of said sleeve being spaced from said holding means, a source of gas under pressure, means communicating said source of gas with said supply passage means for supplying gas through said sleeve passages during a welding operation, a source of anti-smut liquid, and means communicating said source of liquid with said supply passage means for supplying liquid through said sleeve passages during the welding operation.

23. Apparatus according to claim 22 characterized by said sleeve having an outwardly-flaring annular surface in which ends of said sleeve passages terminate, said flared surface forming an included angle of 35–55 degrees with the axis of said sleeve.

24. Apparatus according to claim 23 characterized by said sleeve passages terminating at said flared surface at locations centered above said notches.

25. Apparatus according to claim 24 characterized by said notches being uniformly spaced around the periphery of said spark shield.

26. Apparatus according to claim 22 characterized by end portions of said sleeve having outwardly-extending flanges contacting the inner surface of said spark shield and forming ends of said supply passage means.

27. Apparatus according to claim 23 characterized by said flared surface not extending any farther than the ends of said notches in order not to obstruct said notches.

28. Apparatus according to claim 22 characterized by said notches being spaced substantially uniformly around said spark shield.

29. Apparatus according to claim 22 characterized by said notches including one large notch extending around from one fourth to two-fifths of the periphery of said spark shield.

30. Apparatus according to claim 22 characterized by said sleeve being made of a plastic material resistant to weld splatter.

* * * * *